United States Patent [19]
Vann

[11] Patent Number: 5,732,172
[45] Date of Patent: Mar. 24, 1998

[54] LASER PULSE SAMPLER

[75] Inventor: Charles Vann, Fremont, Calif.

[73] Assignee: The Regents of the University of California, Oakland, Calif.

[21] Appl. No.: 705,448

[22] Filed: Aug. 29, 1996

[51] Int. Cl.⁶ ............................................. G02B 6/26
[52] U.S. Cl. ......................... 385/37; 385/12; 385/141; 385/33; 250/227.2; 250/227.23; 250/227.24
[58] Field of Search ..................... 356/121; 250/227.11, 250/227.2, 227.23, 227.24, 227.27; 385/15, 10, 37, 12, 147, 141, 31, 33

[56] References Cited

U.S. PATENT DOCUMENTS

| | | | |
|---|---|---|---|
| H474 | 6/1988 | Taylor | 385/37 |
| 4,861,128 | 8/1989 | Ishikawa et al. | 385/10 |

*Primary Examiner*—John Ngo
*Attorney, Agent, or Firm*—Henry P. Sartorio; John P. Wooldridge

[57] ABSTRACT

The Laser Pulse Sampler (LPS) measures temporal pulse shape without the problems of a streak camera. Unlike the streak camera, the laser pulse directly illuminates a camera in the LPS, i.e., no additional equipment or energy conversions are required. The LPS has several advantages over streak cameras. The dynamic range of the LPS is limited only by the range of its camera, which for a cooled camera can be as high as 16 bits, i.e., 65,536. The LPS costs less because there are fewer components, and those components can be mass produced. The LPS is easier to calibrate and maintain because there is only one energy conversion, i.e., photons to electrons, in the camera.

18 Claims, 2 Drawing Sheets

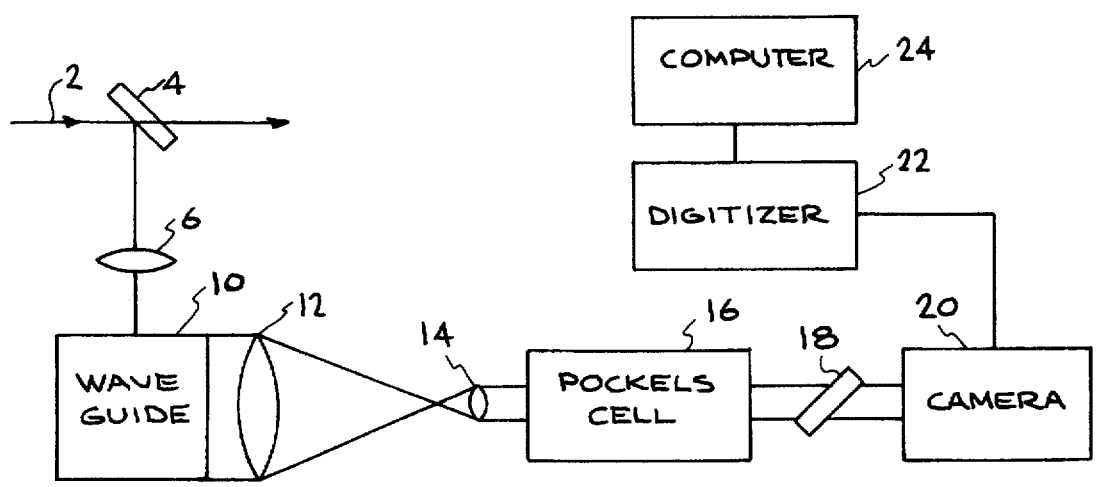
FIG. 1
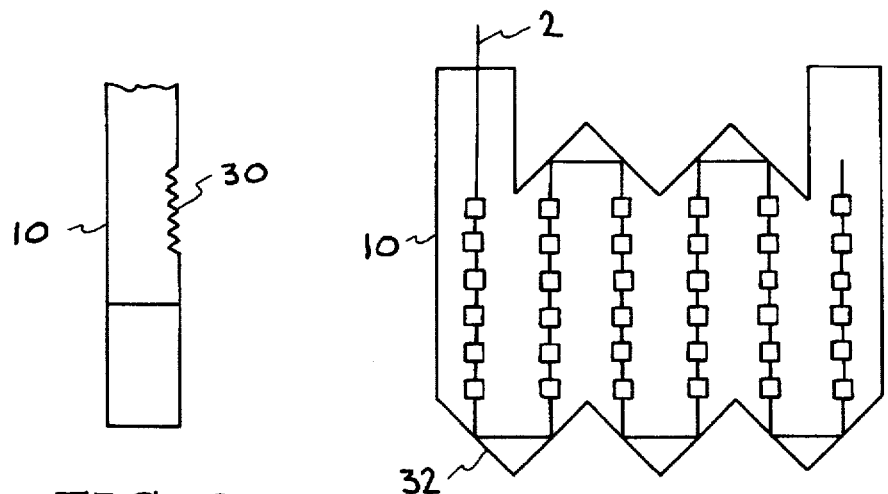
FIG. 2
FIG. 3

LASER PULSE SAMPLER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to systems for measuring the pulse shape of a laser beam and more specifically, it relates to the use of a waveguide diffraction grating in a laser pulse sampler to reconstruct the pulse shape and energy distribution of the laser pulse.

2. Description of Related Art

Work with pulsed lasers often requires information on the temporal shape of the pulse. A common instrument used for this purpose is a streak camera. A streak camera measures a pulse shape by scanning the pulse across a camera chip. The elements (pixels) on the camera chip divide the light into samples which are converted into electrical signals. These samples are digitized to generate a temporal plot of the pulse on a computer. However, to scan the beam across the camera, several energy conversions are required and additional components are necessary including a photo cathode tube, image intensifier, and a phosphorous plate. All this equipment makes the streak camera extremely expensive, one hundred thousand dollars or more, and the many energy conversions makes the device difficult to calibrate and maintain. For some applications, the major problem with this device is its limited dynamic range. While a cooled camera can have an extremely high dynamic range (~16,000), the streak-tube photo cathode limits the streak camera to a maximum dynamic range of much less (about 40).

SUMMARY OF THE INVENTION

It is an object of the present invention to measure the temporal shape of a laser pulse.

The Laser Pulse Sampler (LPS) measures temporal pulse shape without the problems of a streak camera. Unlike the streak camera, the laser pulse directly illuminates a camera in the LPS such that no additional equipment or energy conversions are required. The LPS has several advantages over streak cameras. The dynamic range of the LPS is limited only by the range of its camera, which for a cooled camera can be as high as 16 bits. The LPS costs less because there are fewer components, and those components can be mass produced. The LPS is easier to calibrate and maintain because there is only one energy conversion, i.e., photons to electrons, in the camera.

BRIEF DESCRIPTION OF THE DRAWINGS

FIG. 1 shows an embodiment of the Laser Pulse Sampler.

FIG. 2 shows a side view of the waveguide for the laser pulse sampler.

FIG. 3 illustrates the path that a laser pulse may take through the waveguide of the present invention.

DETAILED DESCRIPTION OF THE INVENTION

Figure 4:
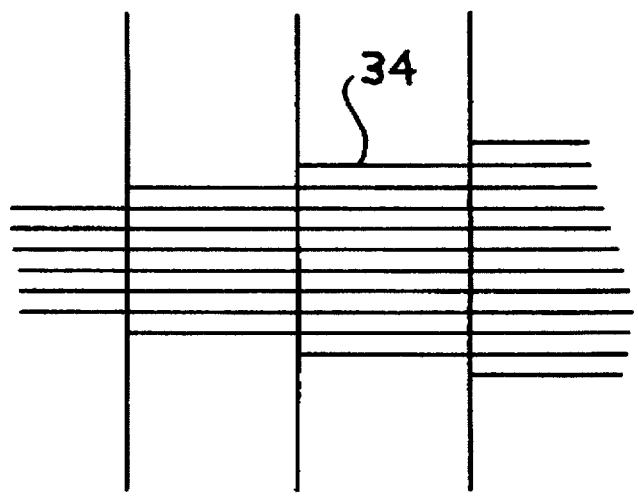
FIG. 4 depicts notches cut in the waveguide of the present invention to form a grating.

Referring to FIG. 1, an embodiment of the laser pulse sampler includes a wave-guide 10, two lenses 12 and 14, a Pockels cell 16 with its driver, a polarizer 18, a camera 20, a digitizer 22 and a computer 24. The laser pulse 2 is injected (in this case with a beamsplitter 4 and a lens 6) into the wave-guide 10, which is shaped to form a compact, square substrate. The wave guide 10 is designed such that it takes the pulse 2 longer to pass through it than the time length of the pulse. For example, an LPS to sample a 20 nanosecond laser pulse of 1053 nanometer wavelength light could be passed through an eight-foot long path of high-index material like ZnSe. Since it takes a point on the beam longer than 20 nanoseconds to pass through eight feet of ZnSe material, the entire pulse would be contained inside the waveguide 10 for a brief moment in time. It is at that brief moment that an image of energy samples along the beam is desired. This is done with small gratings (see FIG. 2) cut into the waveguide 10. These gratings extract a small amount of light from the waveguide and direct it towards a CCD camera and in the same beam polarization. To maintain uniform sampling along the entire pulse, the depth of the gratings would increase along the path to make up for accumulated energy loss in prior samplings. The gratings are spaced to represent an exact measurement of time, dividing the pulse into many different temporal samples of the pulse, possibly hundreds of samples.

In one embodiment, the dimension of the waveguide is 50×50 mm and 2 mm. The waveguide material must transmit the wavelength of light to be measured. It should have a high index of refraction such as germanium or Zinc Selenide (this slows down the light). However, simple glass would do for short pulses. This will be a design for order characteristic. The waveguide material must be durable but easy to etch groves into the surface, and must be machinable or moldable. Notches are cut into the waveguide to cause the light to reflect from one channel into another. Grating depth is determined by the wavelength of light. The depth determines which wavelengths will reflect and how much energy will be extracted. For 1053 nm light, the depth will be less than a micrometer. The number of gratings will increase along the path to compensate for diminishing amounts of light.

Figure 5:
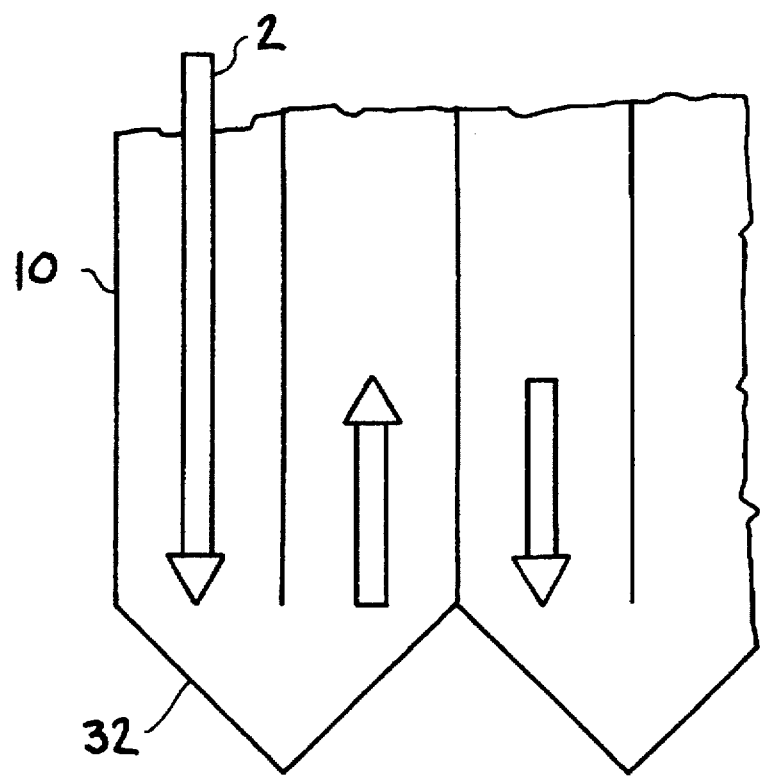
FIG. 5 shows total internal reflection of a laser pulse at the 45 degree reflective surfaces of the waveguide of the present invention.

FIG. 2 shows a side view of the waveguide for the laser pulse sampler. A grating 30 is formed in the edge of waveguide 10. FIG. 3 illustrates the path that laser pulse 2 takes through waveguide 10. The laser pulse 2 under goes total internal reflection at the ends of waveguide 10, where 45 degree reflectors 32 are formed. FIG. 4 depicts the notches 34 cut in waveguide 10 to form the grating 30 (FIG. 2). The number of notches 34 cut into waveguide 10 progressively increases with each pass of laser pulse 2 through waveguide 10. FIG. 5 shows total internal reflection of laser pulse 2 at the 45 degree reflective surfaces 32 of waveguide 10.

Referring again to FIG. 1, the two lenses 12 and 14 relay the light from the samples on the waveguide 10 onto the camera chip 20. The light should go through focus between the two lenses. This allows the image of the waveguide to be imaged directly onto the camera. The light passes through a Pockels cell and a polarizer which optically time gates the samples, in a manner similar to the way a mechanical shutter time gates the light for a still photograph. When the Pockels cell is "on", the beam polarization is rotated 90 degrees to pass through the polarizer and onto the camera. When the Pockels cell is "off", the beam polarization is not rotated and is reflected out of the path by the polarizer. Instead of a Pockels cell, it may be possible to use light sensitive materials to rotate the polarization of the beam. Special crystals change the polarization of a beam passing through it, if and only if, they are illuminated by another laser beam (Kerr effect).

Unless the Pockels cell is activated, the polarization of the light passing through it will not change, i.e., it acts like an optically transparent plate. All the light coming from the waveguide has the same polarization. This is because the pulse beam is polarized and the gratings and waveguide channels are such that they purposely do not change the polarization of the light. Consequently, the polarizer is oriented such that it rejects all the light in that polarization. The polarizer is oriented such that it has S-polarization when the Pockels cell is "off." The light reflects up from the polarizer and is absorbed by a beam dump—none of the light reaches the camera. However, if the Pockels cell is turned "on," it causes the polarization to change by 90 degrees such that the polarizer passes the light (P-polarization). The time the Pockels cell is left open (gate time) is short by design because it determines the time resolution of the device. An important feature of Pockels cells is a fast rise time, i.e., how fast will the cell turn "on". The close time is easier because it is simply turning off the voltage. In practice, more than one polarizers may be needed since the camera should see absolutely no light when the Pockels cell is "off." Most polarizers leak about 1/100 th of the light it sees, and using two polarizers would improve the ration to about 1/10000. The Pockels Cell can have an optical diameter of only 2.5 mm and the polarizers can be equally small.

The camera converts the photons into electrical signals which are digitized for calculations and display. Because the temporal differences between samples are known, a pulse shape and energy distribution can be constructed from the data. Because the gate time of the pockets cell is not infinitely short, the samples are actually a measurement of energy integrated over one segment of the pulse shape with that width of that segment defined by the gate time of the Pockels cell.

The computer program is known in the art. Simple programs are common to find the energy accumulated on a predescribed set of pixels. See, e.g., Multidimensional Digital Signal Processing by Dan E. Dudgeon and Russell M. Mersereau.

The description above discusses capturing only one beam shape per device, but, to lower cost, the device could be modified to accommodate multiple beams. Also, to keep costs low, the wave-guide and grating could be mass-produced as a monolithic part.

The LPS may be an affordable option for measuring over 600 high-contrast, pulse shapes at the same time on the future National Ignition Facility (N/F) at Lawrence Livermore National Laboratory. NIF will have hundreds of beams which must be accurately balanced in power on the target. Measuring and correcting the pulse shape of each beam is the only way to ensure this power balance. The power balance accuracy requirement and the high contrast ratio of the pulse dictates a measurement with a dynamic ratio of ~1000. Existing streak cameras are inherently limited to maximum dynamic ranges of around 40. This range can be increased by stacking several cameras per pulse, but the complexity and cost of this is not attractive. Fast photodiodes with transient digitizers is another approach, but the cost is prohibitive without major breakthroughs in the technology. In contrast, the LPS has more dynamic range than needed for NIF. Its components can be mass produced to keep costs affordable, and its simplicity should make it easier to calibrate and maintain.

Streak cameras are a commercial product with many applications and users. The LPS will be a far better product and should dominate the market. Its performance will greatly exceed the performance of any streak camera because of the huge difference in dynamic range, and its simplicity should insure a substantially lower cost and ease of use.

Changes and modifications in the specifically described embodiments can be carried out without departing from the scope of the invention, which is intended to be limited by the scope of the appended claims.

I claim:

1. A laser pulse sampler, comprising:
    a waveguide comprising an optical path length that is greater than the pulse length of said laser pulse, wherein said waveguide further comprises gratings to extract light comprising temporal samples from said waveguide;
    means for optically time gating said temporal samples from said waveguide to produce a plurality of time gated temporal samples;
    a camera for converting said plurality of time gated temporal samples into a plurality of electrical signals;
    a digitizer for digitizing said plurality of electrical signals to produce a digitized signal; and
    a computer comprising a program for processing said digitized signal to construct the pulse shape and energy distribution of said laser pulse.

2. The laser pulse sampler of claim 1, wherein said waveguide comprises a square substrate.

3. The laser pulse sampler of claim 1, wherein the depth of said gratings increases along said optical path to maintain uniform sampling of said laser pulse through said waveguide, thus compensating for accumulated energy loss in prior samplings.

4. The laser pulse sampler of claim 1, wherein said gratings are spaced to represent an exact measurement of time to divide said, laser pulse into a plurality of temporal samples.

5. The laser pulse sampler of claim 1, wherein said means for optically time gating said temporal samples comprises a Pockels cell and a polarizer, wherein said temporal samples comprise a polarization, wherein said beam polarization is rotated 90 degrees to pass through said polarizer and onto said camera when said Pockels cell is "on" and wherein said beam polarization is not rotated by said polarizer when said Pockels cell is "off."

6. The laser pulse sampler of claim 1, wherein said waveguide comprises ZnSe.

7. The laser pulse sampler of claim 1, wherein said waveguide comprises germanium.

8. The laser pulse sampler of claim 1, wherein said waveguide comprises glass.

9. The laser pulse sampler of claim 1, wherein said camera comprises a CCD camera.

10. The laser pulse sampler of claim 1, wherein said waveguide comprises 45 degree reflectors.

11. The laser pulse, sampler of claim 5, wherein said polarizer comprises a plurality of polarizers.

12. The laser pulse sampler of claim 1, wherein said program finds the energy accumulated on a predescribed set of pixels of said camera.

13. A method of sampling a laser pulse comprising:
    injecting a laser pulse into a waveguide comprising an optical path length that is greater than the pulse length of said laser pulse, said waveguide further comprising gratings to extract light in the form of temporal samples from said waveguide;
    optically time gating said temporal samples from said waveguide to produce a plurality of time gated temporal samples;

converting said plurality of time gated temporal samples into a plurality of electrical signals;

digitizing said plurality of electrical signals to produce a digitized signal; and processing said digitized signal to construct the pulse shape and energy distribution of said laser pulse.

14. The method of claim 13, wherein said waveguide comprises a square substrate.

15. The method of claim 13, wherein the depth of said gratings increases along said optical path to maintain uniform sampling of said laser pulse through said waveguide, thus compensating for accumulated energy loss in prior samplings.

16. The method of claim 13, wherein said gratings are spaced to represent an exact measurement of time to divide said laser pulse into a plurality of temporal samples.

17. The method of claim 13, wherein the step of optically time gating said temporal samples comprises rotating the polarization of said temporal samples 90 degrees to pass through a polarizer and onto a camera when a Pockels cell is "on" and wherein said beam polarization is not rotated by said polarizer when said Pockels cell is "off."

18. The method of claim 13, wherein said waveguide comprises a material selected from a group consisting of ZnSe, germanium and glass.

* * * * *